United States Patent
Ito et al.

(10) Patent No.: US 8,797,245 B2
(45) Date of Patent: Aug. 5, 2014

(54) DISPLAY DEVICE WITH DISPLAY PANEL AND BACKLIGHT

(75) Inventors: Hiroshi Ito, Chiba (JP); Kazunori Ojima, Mobara (JP); Takeshi Kaneki, Mobara (JP); Atsushi Fukai, Mobara (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 502 days.

(21) Appl. No.: 12/785,836

(22) Filed: May 24, 2010

(65) Prior Publication Data
US 2010/0302132 A1    Dec. 2, 2010

(30) Foreign Application Priority Data
May 29, 2009   (JP) ................................ 2009-129942

(51) Int. Cl.
*G09G 3/36*    (2006.01)

(52) U.S. Cl.
USPC .......................................... 345/87; 345/905

(58) Field of Classification Search
CPC . G09G 3/3648; G09G 3/3614; G09G 3/3688; G09G 3/3611; G09G 3/3655
USPC ........ 345/87, 905; 361/679.02, 679.3; 349/58
See application file for complete search history.

(56) References Cited

U.S. PATENT DOCUMENTS

| | | | | |
|---|---|---|---|---|
| 5,729,310 | A * | 3/1998 | Horiuchi et al. | 349/62 |
| 6,897,841 | B2 * | 5/2005 | Ino | 345/87 |
| 7,324,172 | B2 * | 1/2008 | Yamazaki | 349/58 |
| 2003/0223020 | A1 * | 12/2003 | Lee | 349/58 |
| 2005/0117086 | A1 * | 6/2005 | Sugahara et al. | 349/58 |
| 2005/0151894 | A1 * | 7/2005 | Katsuda et al. | 349/58 |
| 2007/0070589 | A1 * | 3/2007 | Chen et al. | 361/681 |
| 2007/0262966 | A1 | 11/2007 | Nishimura et al. | |
| 2009/0257207 | A1 * | 10/2009 | Wang et al. | 361/752 |

FOREIGN PATENT DOCUMENTS

JP    2006-146895    6/2006

* cited by examiner

*Primary Examiner* — Chanh Nguyen
*Assistant Examiner* — Jonathan Blancha
(74) *Attorney, Agent, or Firm* — Antonelli, Terry, Stout & Kraus, LLP.

(57) ABSTRACT

A projecting portion is formed on first and second side walls of the inner frame parallel to two sides of the non-overlapping region of the first substrate which intersect with one side of the non-overlapping region of the first substrate. The projecting portion of the inner frame has an opening portion. The lower frame has an opening portion through which the projecting portion of the inner frame penetrates. The projecting portion of the inner frame penetrates the opening portion of the lower frame and projects to a side of the lower frame opposite to the display panel. A protruding portion is formed on the casing correspondingly to the projecting portion of the inner frame. The inner frame is fixed to the casing by making an opening portion formed in the projecting portion of the inner frame engage with the protruding portion of the casing.

6 Claims, 6 Drawing Sheets

DISPLAY DEVICE WITH DISPLAY PANEL AND BACKLIGHT

CROSS-REFERENCE TO RELATED APPLICATION

The present application claims priority from Japanese application JP2009-129942 filed on May 29, 2009, the content of which is hereby incorporated by reference into this application.

BACKGROUND OF THE INVENTION

1. Field of the Invention

The present invention relates to a display device, and more particularly to a display device which includes a display panel, a touch panel which is arranged on a surface of the display panel, and a front panel which is arranged on a surface of the touch panel.

2. Description of the Related Art

A liquid crystal display device (also referred to as "liquid crystal display module") having a miniaturized TFT (Thin Film Transistor)-type liquid crystal display panel has been popularly used as a display part of portable equipment such as a mobile phone.

Recently, along with spreading of mobile equipment, a touch panel technique which supports a "user friendly" graphical user interface becomes important. In this respect, there has been known a liquid crystal display panel with a touch panel in which a touch panel substrate is mounted on a surface of the liquid crystal display panel and an operation corresponding to a menu is performed when a user touches a menu screen displayed on the liquid crystal display panel with his finger (see JP 2006-146895 A).

On the other hand, with respect to the above-mentioned liquid crystal display device, there has been known the structure in which on a viewer-side polarizer of a liquid crystal display panel, a front panel is fixed by way of an adhesive material having substantially the same refractive index as the polarizer (hereinafter referred to as "hybrid panel structure"). This hybrid panel structure, compared to the structure where a front panel is arranged on a viewer-side polarizer of a liquid crystal display panel with an air gap layer therebetween, has characteristics such as (1) being free from dusts (mixing of a small quantity of foreign substances), (2) reduction of thickness of the liquid crystal display panel, (3) favorable outdoor visibility, (4) high brightness and the like.

FIG. 7 is a cross-sectional view of an essential part for explaining a conventional liquid crystal display device having the hybrid panel structure with a touch panel.

In FIG. 7, symbol LCD indicates a liquid crystal display panel, symbol BL indicates a backlight, symbol 10 indicates a front panel, and symbol 100 indicates an electrostatic capacitance coupling type touch panel.

As the liquid crystal display panel LCD, for example, an IPS method liquid crystal display panel, a TN method liquid crystal display panel, a VA method liquid crystal display panel or the like is used. The liquid crystal display panel LCD is formed by laminating two substrates 1, 2 which are arranged to face each other in an opposed manner. Polarizers 3, 4 are provided to outer sides of two substrates respectively.

The liquid crystal display panel LCD and the touch panel 100 are adhered to each other by a first adhesive material 101 formed of a resin adhesive film or the like.

To an outer side of the touch panel 100, the front panel (also referred to as "front window", "front surface protective plate") 10 made of an acrylic resin or reinforced glass is adhered by a second adhesive material 102 formed of a resin adhesive film or the like.

The backlight BL is constituted of a resin mold frame (simply referred to as "mold" hereinafter) 11, a light guide plate 12 which is housed in the inside of the mold 11, a group of optical sheets 13 which is arranged on the light guide plate 12, a reflection sheet 14 which is arrange below the light guide plate 12, a light emitting diode (LD; not shown in the drawing) which is arranged on one side surface of the light guide plate 12 and functions as a light source, and a lower frame 60 which is arranged below the mold 11. Here, the group of optical sheets 13 is constituted of, for example, a lower diffusion sheet, two lens sheets and an upper diffusion sheet.

In the liquid crystal display device shown in FIG. 7, the front panel 10 has portions which overhang toward the outside from the touch panel 100 at four sides (showing only one side in FIG. 7) thereof, and lower surfaces of these portions are fixed to a casing 200 of portable equipment (for example, mobile phone) by a pressure sensitive adhesive double-coated tape 31, for example. Further, the first substrate 1 of the liquid crystal display panel LCD is fixed to the mold 11 by a pressure sensitive adhesive double-coated tape 30.

Further, the liquid crystal display panel LCD and the touch panel 100 are adhered to each other by the first adhesive material 101 formed of a resin adhesive film or the like, and the touch panel 100 and the front panel 10 are adhered to each other by the second adhesive material 102 formed of a resin adhesive film or the like.

Accordingly, an adhering portion between the touch panel 100 and the casing 200 or an adhering portion between the liquid crystal display panel LCD and the mold 11 is more liable to be peeled off compared to an adhering portion between the liquid crystal display panel LCD and the touch panel 100 or an adhering portion between the touch panel 100 and the front panel 10. Accordingly, when an impact is applied to the liquid crystal display device due to falling of the liquid crystal display device or the like, the touch panel 100 is peeled off from an adhering surface with the casing 200 or the liquid crystal display panel LCD is peeled off from an adhering surface with the mold 11, so that there exists a possibility that the liquid crystal display panel LCD comes out from the casing 200, or the backlight BL drops from the lower frame 60 and the liquid crystal display panel LCD comes out from the casing 200 together with the backlight BL.

SUMMARY OF THE INVENTION

The invention has been made to overcome the above-mentioned drawbacks of the related art, and it is an object of the invention to provide a technique which can enhance resistance of a display device having the hybrid panel structure against vibrations and impacts.

The above-mentioned and other objects and novel features of the invention will become apparent from the description of this specification and attached drawings.

To briefly explain the summary of typical inventions among the inventions described in this specification, they are as follows.

(1) The invention is directed to a display device which includes: a display panel having a first substrate and a second substrate; a mold which is arranged on a side of the display panel opposite to a viewer; and a front panel which is arranged on a viewer's side of the display panel, the front panel having a peripheral portion thereof fixed to a casing, wherein the display device further includes an inner frame which houses the mold and a lower frame which houses the inner frame, the inner frame has a flat portion and side walls provided to a periphery of the flat portion, peripheral portions on four sides of the first substrate are fixed to a first surface of the flat portion of the inner frame, peripheral portions on four sides of the mold are fixed to a surface of the flat portion of the inner frame on a side opposite to the first surface of the flat portion of the inner frame, the first substrate includes a non-overlapping region where the first substrate does not overlap with the second substrate, at least one projecting portion is formed on first and second side walls of the inner frame parallel to two sides of the non-overlapping region of the first substrate which intersect with one side of the non-overlapping region of the first substrate, at least one projecting portion of the inner frame has an opening portion, the lower frame has an opening portion through which the projecting portion of the inner frame penetrates, at least one projecting portion of the inner frame penetrates the opening portion of the lower frame and projects to a side of the lower frame opposite to the display panel, a protruding portion is formed on the casing correspondingly to at least one projecting portion of the inner frame, and the inner frame is fixed to the casing by making an opening portion formed in at least one projecting portion of the inner frame engage with the protruding portion of the casing.

(2) In the display device having the above-mentioned constitution (1), a touch panel is provided between the display panel and the front panel.

(3) In the display device having the above-mentioned constitution (1) or (2), two or three projecting portions are formed on the first and second side walls of the inner frame respectively.

(4) In the display device having any one of the above-mentioned constitutions (1) to (3), the projecting portions are formed on the first and second side walls of the inner frame in a spaced-apart manner from each other with a distance of 20 mm or more.

(5) In the display device having any one of the above-mentioned constitutions (1) to (4), the casing includes an opening portion into which at least one projecting portion of the inner frame is inserted, and the protruding portion is arranged in the inside of the opening portion formed in the casing in the direction orthogonal to at least one projecting portion of the inner frame.

(6) In the display device having any one of the above-mentioned constitutions (1) to (5), the peripheral portions on four sides of the first substrate are fixed to the first surface of the flat portion of the inner frame by a pressure sensitive adhesive double-coated tape, and the peripheral portions on four sides of the mold are fixed to the surface of the flat portion of the inner frame on a side opposite to the first surface by a pressure sensitive adhesive double-coated tape.

(7) In the display device having any one of the above-mentioned constitutions (1) to (6), a semiconductor chip is mounted on the non-overlapping region of the first substrate.

To briefly explain the advantageous effects acquired by typical inventions among the inventions disclosed in this specification, they are as follows.

According to the invention, it is possible to enhance the resistance of the display device having the hybrid panel structure against vibrations and impact.

DETAILED DESCRIPTION OF THE INVENTION

Hereinafter, an embodiment of a liquid crystal display device to which the invention is applied is explained in detail in conjunction with drawings.

Here, in all drawings for explaining the embodiment, parts having identical functions are given same symbols and their repeated explanation is omitted. Further, in this embodiment, the explanation is made by taking a liquid crystal display panel as one example of the display panel. Here, the display panel is not limited to a liquid crystal display panel provided that the display panel can use a touch panel. That is, the display panel may be a display panel which uses organic light emitting diode elements or a display panel which uses surface conduction type electron emission elements.

[The Structure of Liquid Crystal Display Device which Becomes the Premise of the Invention]

Figure 1:
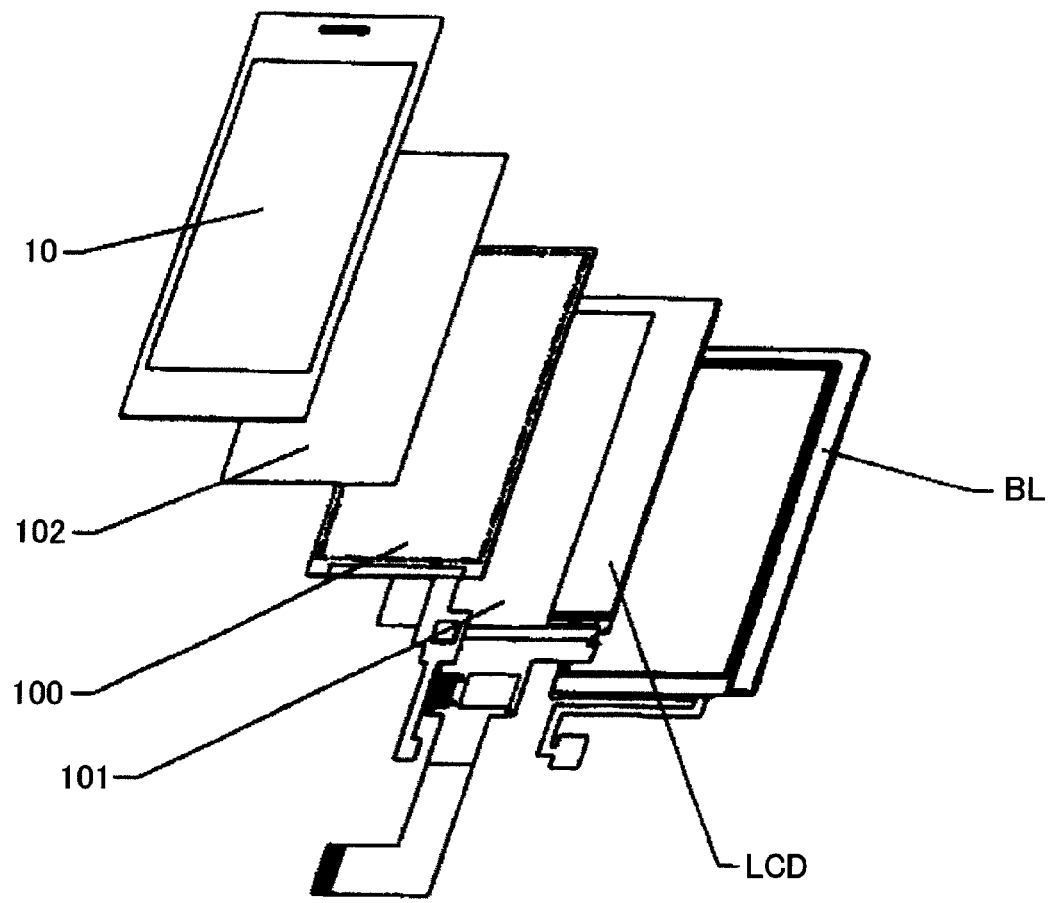
FIG. 1 is an exploded perspective view showing a liquid crystal display device having the hybrid panel structure with a touch panel which becomes the premise of the invention.

FIG. 1 is an exploded perspective view showing a liquid crystal display device having the hybrid panel structure with a touch panel which becomes the premise of the invention. In FIG. 1, symbol LCD indicates a liquid crystal display panel, symbol BL indicates a backlight, symbol 10 indicates a front panel, and symbol 100 indicates a touch panel.

The liquid crystal display panel LCD and the touch panel 100 are adhered to each other by a first adhesive material 101 formed of a resin adhesive film or the like. Further, to an outer side of the touch panel 100, a front panel (also referred to as "front window" or "front-surface protecting plate") 10 which is made of an acrylic resin or glass is adhered by a second adhesive material 102 formed of a resin adhesive film or the like.

The liquid crystal display device having the hybrid panel structure with a touch panel according to the embodiment of the invention includes, in the same manner as the constitution in FIG. 1, a liquid crystal display panel LCD, a backlight BL, the touch panel 100 which is adhered to the liquid crystal display panel LCD by the first adhesive material 101, and the front panel 10 which is adhered to the touch panel 100 by the second adhesive material 102. Here, in this embodiment, as the touch panel 100, an electrostatic-capacitance-coupling-type touch panel or a resistance-film-type touch panel is used.

[Embodiment]

Figure 2:
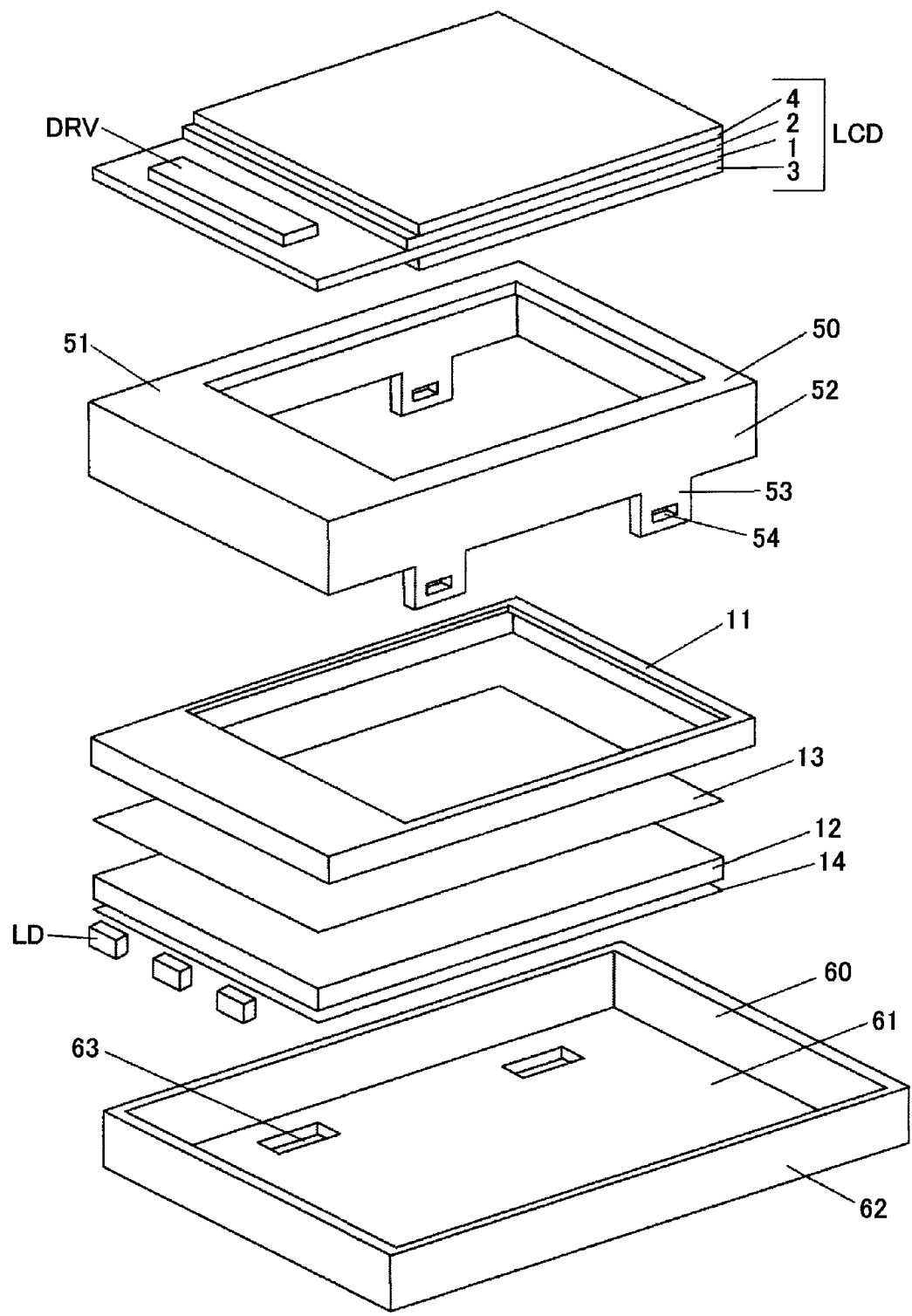
FIG. 2 is a view showing the structure of a liquid crystal display panel and a backlight of the liquid crystal display device having the hybrid panel structure with a touch panel according to an embodiment of the invention.

FIG. 2 is a view showing the structure of the liquid crystal display panel LCD and the backlight BL of the liquid crystal display device having the hybrid panel structure with a touch panel according to the embodiment of the invention.

Figure 3:
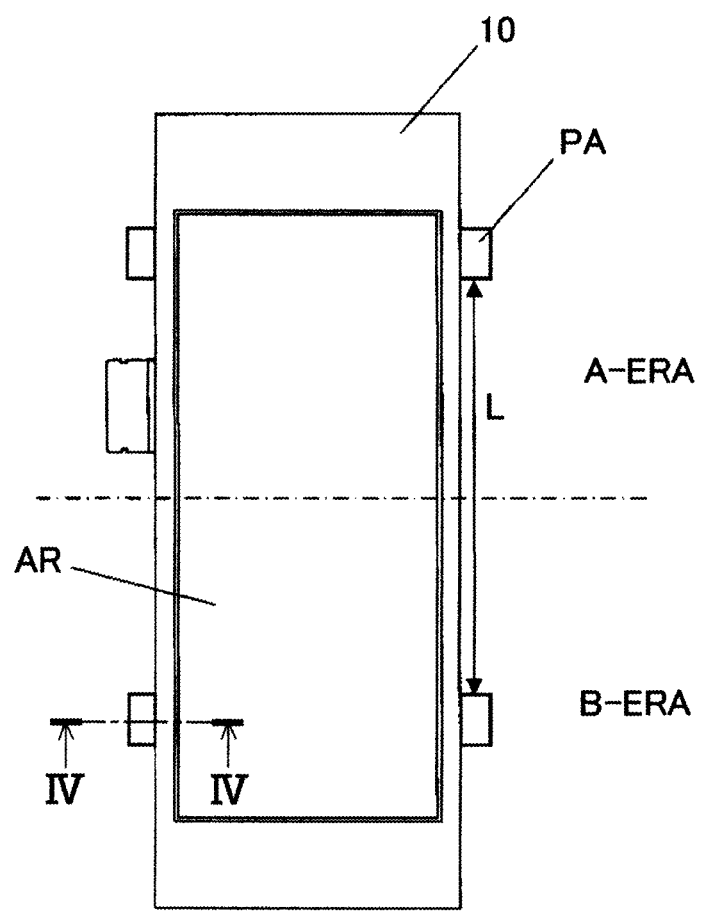
FIG. 3 is a plan view for explaining positions of projecting portions which are formed on side walls of an inner frame of the embodiment of the invention.

As shown in FIG. 2, this embodiment is further provided with an inner frame 50 as the structure which prevents the liquid crystal display panel LCD from flying out. The inner frame 50 is constituted of a flat portion 51 and side walls 52 which are formed on a periphery of the flat portion 51. Four projecting portions 53 each of which has an opening portion 54 are formed on the side walls 52. A resin mold frame (hereinafter, simply referred to as "mold") 11 is housed in the inside of the inner frame 50. Here, the flat portion of the inner frame 50 to which the liquid crystal display panel LCD is fixed has a flat surface. FIG. 3 is a plan view for explaining positions of the projecting portions 53 which are formed on the side walls 52 of the inner frame 50 of this embodiment. In FIG. 3, symbol AR indicates a display region, and symbol PA indicates positions of the projecting portions 53 which are formed on the side walls 52 of the inner frame 50. As shown in FIG. 3, in this embodiment, the projecting portions 53 which are formed on the side walls 52 of the inner frame 50 are formed such that the two projecting portions 53 are formed on each of two side walls 52 which extend parallel to long sides of a first substrate 1.

Figure 4:
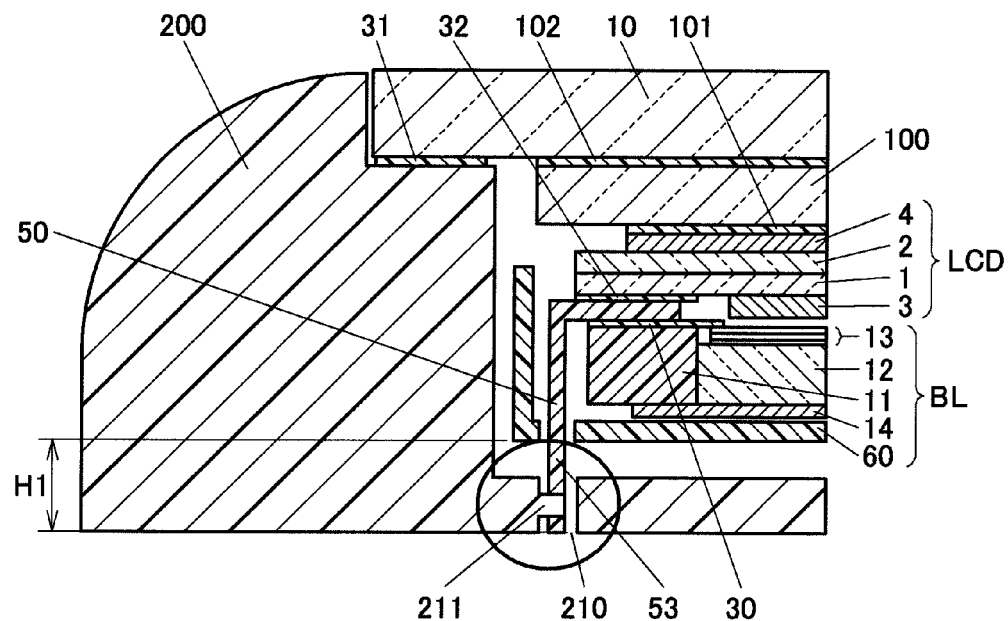
FIG. 4 is a cross-sectional view of an essential part for explaining a liquid crystal display device having the hybrid panel structure with a touch panel according to the embodiment of the invention.

FIG. 4 is a cross-sectional view of an essential part for explaining the liquid crystal display device having the hybrid panel structure with a touch panel according to the embodiment of the invention, and FIG. 4 is a cross-sectional view taken along a line IV-IV in FIG. 3.

The liquid crystal display panel LCD of this embodiment includes the first substrate 1, a second substrate 2, a liquid crystal layer (not shown in the drawing) which is sandwiched between the first substrate 1 and the second substrate 2, a semiconductor chip DRV on which a drive circuit is mounted, a flexible printed circuit board (not shown in the drawing) which is connected to at least one side of the first substrate 1, a lower polarizer 3 which is adhered to the first substrate 1, and an upper polarizer 4 which is adhered to the second substrate 2. Here, a side of the second substrate 2 opposite to a liquid crystal layer becomes a viewer's side.

As the first and second substrates (1, 2), for example, a transparent insulation substrate made of glass or the like is used. A long side of the first substrate 1 is set longer than a long side of the second substrate 2 thus providing the first substrate 1 with a region where the first substrate 1 does not overlap with the second substrate 2 (hereinafter, referred to as "non-overlapping region"). The semiconductor chip DRV is mounted in the non-overlapping region on a liquid-crystal-layer-side surface of the first substrate 1.

Thin film transistors, pixel electrodes and the like are formed on the first substrate 1, and color filters and the like are formed on the second substrate 2. Here, when the liquid crystal display panel is of an IPS type, counter electrodes are formed on the first substrate 1 side, and when the liquid crystal display panel is of a TN type or a VA type, counter electrodes are formed on the second substrate 2 side.

The touch panel 100 is adhered to the upper polarizer 4 of the liquid crystal display panel LCD by the first adhesive material 101 which is formed of a resin adhesive film or the like having a refractive index substantially equal to a refractive index of the upper polarizer 4.

To the outer side of the touch panel 100, a front panel (also referred to as "front window" or "front-surface protecting plate") 10 made of an acrylic resin or reinforced glass (having a thickness of 0.5 to 1.0 mm) is adhered by the second adhesive material 102 formed of a resin adhesive film and the like.

In this embodiment, the backlight BL is constituted of the mold 11, a light guide plate 12, a group of optical sheets 13, a reflection sheet 14, light emitting diodes LD, the inner frame 50, and a lower frame 60.

As shown in FIG. 2, the light guide plate 12 is arranged in the inside of the resin mold frame (hereinafter, simply referred to as "mold") 11, and the group of optical sheets 13 is arranged on the light guide plate 12. Further, the reflection sheet 14 is arranged below the light guide plate 12, and the light emitting diodes LD which function as a light source are arranged on one side surface of the light guide plate 12.

The lower frame 60 is arranged below the mold 11. Here, the group of optical sheets 13 is constituted of a lower diffusion sheet, two lens sheets and an upper diffusion sheet, for example.

In this embodiment, the inner frame 50 is additionally provided between the liquid crystal display panel LCD and the mold 11, the first substrate 1 of the liquid crystal display panel LCD and the mold 11 are respectively fixed to both surfaces of the flat portion 51 of the inner frame 50 by pressure sensitive adhesive double-coated tapes (30, 32) thus fixing the liquid crystal display panel LCD and the backlight BL to each other. The liquid crystal display device according to this embodiment is manufactured as follows. Firstly, the liquid crystal display panel LCD, the touch panel 100 and the front panel 10 are formed into an integral body by ultraviolet-ray curing or an adhesive film. Then, the inner frame 50 is adhered to the mold 11 by the pressure sensitive adhesive double-coated tape 30. Thereafter, the integral body formed of the liquid crystal display panel LCD, the touch panel 100 and the front panel 10 and the body formed by the adhesion of the inner frame 50 to the mold 1 are assembled together by adhesion using the pressure sensitive adhesive double-coated tape 32. Then, the assembled body is incorporated into a casing.

As shown in FIG. 2, four projecting portions 53 each of which has the opening portion 54 are formed on the side walls 52 of the inner frame 50. Further, the lower frame 60 is constituted of a bottom surface 61 and side walls 62 which are formed on a periphery of the bottom surface 61. Further, opening portions 63 are formed in the bottom surface 61 of the lower frame 60. The projecting portions 53 which are formed on the side walls 52 of the inner frame 50 penetrate the opening portions 63 which are formed in the bottom surface 61 of the lower frame 60 and project to the outside of the lower frame 60 (to a side of the bottom surface 61 of the lower frame 60 opposite to the liquid crystal display panel LCD). In the liquid crystal display device of this embodiment, the front panel 10 has portions which overhang toward the outside from the touch panel 100 at four sides (showing only one side in FIG. 4) thereof, and lower surfaces of these portions are fixed to a support portion on the periphery of a recessed portion of a casing 200 of portable equipment (for example, mobile phone) by a pressure sensitive adhesive double-coated tape 31, for example. Further, opening portions 210 into which the projecting portions 53 formed on the side walls 52 of the inner frame 50 are inserted are formed in a bottom portion of the recessed portion of the casing 200 of the portable equipment, and a protruding portion (hook) 211 is formed in the inside of the opening portion 210 such that the protruding portion 211 orthogonally intersects with the projecting portion 53 formed on the side wall 52 of the inner frame 50. Here, the inner frame 50 is formed of a stainless steel sheet having a thickness of 0.1 to 0.2 mm, for example. In the same manner, the lower frame 60 is formed of a stainless steel sheet having a thickness of 0.1 to 0.3 mm. A thickness of the pressure sensitive adhesive double-coated tape (30, 32) is set to 0.05 to 0.2 mm. Here, the inner frame 50 and the lower frame 60 are fixed to the mold 11 using a method in which engaging pawls formed on the inner frame 50 and the lower frame 60 are engaged with projecting portions formed on the mold 11 or the like.

In this embodiment, as shown in FIG. 4, the inner frame 50 (that is, liquid crystal display device) is fixed to the casing 200 of the portable equipment as follows. Portions of four projecting portions 53 which are formed on two side walls 52 on a long side of the inner frame 50 and project from the lower frame 60 are inserted into the opening portions 210 which are formed in the bottom surface of the recessed portion of the casing 200 of the portable equipment. Then, the opening portions 54 which are formed in four projecting portions 53 formed on two side walls 52 on a long side of the inner frame 50 are engaged with the protruding portions 211 in the inside of the opening portions 210 which are formed in the bottom surface of the recessed portion of the casing 200 of the portable equipment.

As described above, in this embodiment, the inner frame 50 is additionally provided between the liquid crystal display panel LCD and the mold 11 of the backlight BL, the first substrate 1 of the liquid crystal display panel LCD and the mold 11 are fixed to both surfaces of the flat portion 51 of the inner frame 50 by the pressure sensitive adhesive double-coated tapes (30, 32) thus fixing the liquid crystal display panel LCD and the backlight BL to each other.

In this case, by additionally providing the inner frame 50, the backlight BL and the liquid crystal display panel LCD are joined to each other by way of the rigid parts and hence, a holding strength of the liquid crystal display device can be enhanced compared to the conventional structure.

Here, the projecting portions 53 are formed on the side walls 52 of the inner frame 50, and the projecting portions 53 are fixed to the casing. Further, the lower frame 60 made of the same material as the inner frame 50 is provided so as to cover the inner frame 50.

Due to these structures, in this embodiment, when an impact is applied to the liquid crystal display device by falling of the liquid crystal display device or the like, it is possible to prevent the liquid crystal display panel LCD from flying out from the casing in a state that the touch panel 100 and the front panel 10 are mounted on the liquid crystal display panel LCD.

Here, a projection length (indicated by H1 in FIG. 4) of the projecting portion 53 formed on the side wall 52 of the inner frame 50 and projecting from the lower frame 60 is set to 1.5 mm≤H1≤5.0 mm.

A width (indicated by W1 in FIG. 5) of the projecting portion 53 formed on the side wall 52 of the inner frame 50 is set to 4.0 mm≤H1≤10.0 mm. A width (indicated by W2 in FIG. 5) of the opening portion 54 formed in the projecting portion 53 formed on the side wall 52 of the inner frame 50 is set to satisfy the relationship of W2=W1×0.7.

A height (indicated by H2 in FIG. 5) of the opening portion 54 formed in the projecting portion 53 formed on the side wall 52 of the inner frame 50 is set to 0.8 mm≤H2≤1.2 mm. Here, the height H2 indicated in FIG. 5 also corresponds to a height of the protruding portion 211 disposed in the inside of the opening portion 210 formed in the bottom portion of the recessed portion of the housing 200 of the portable equipment.

Figure 5:
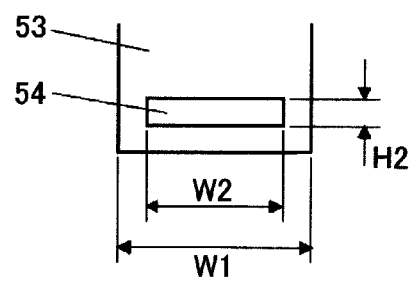
FIG. 5 is a view for explaining the projecting portion formed on the side wall shown in FIG. 2.

FIG. 5 is a view for explaining the projecting portion 53 formed on the side wall 52 of the inner frame 50 shown in FIG. 2. A distance (L in FIG. 3) between the projecting portions 53 formed on the side walls 52 of the inner frame 50 is set larger than 20 mm (L>20 mm). In this embodiment, when the display region AR is divided in two, that is, into an A area (A-ERA) and a B area (B-ERA) at the center of the longitudinal direction of the front panel 10, one projecting portion 53 is allocated to each of the A area (A-ERA) and the B area (B-ERA).

Figure 6A:
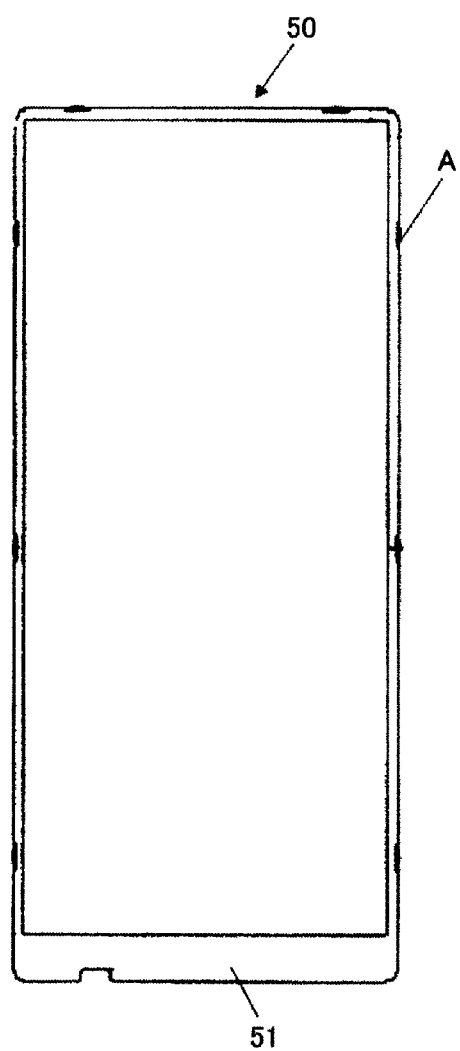
FIG. 6 is a view showing a modification of the inner frame according to the embodiment of the invention.
Figure 6B:
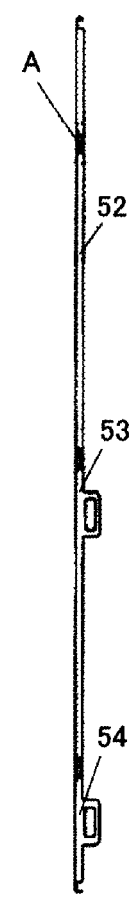
Figure 7:
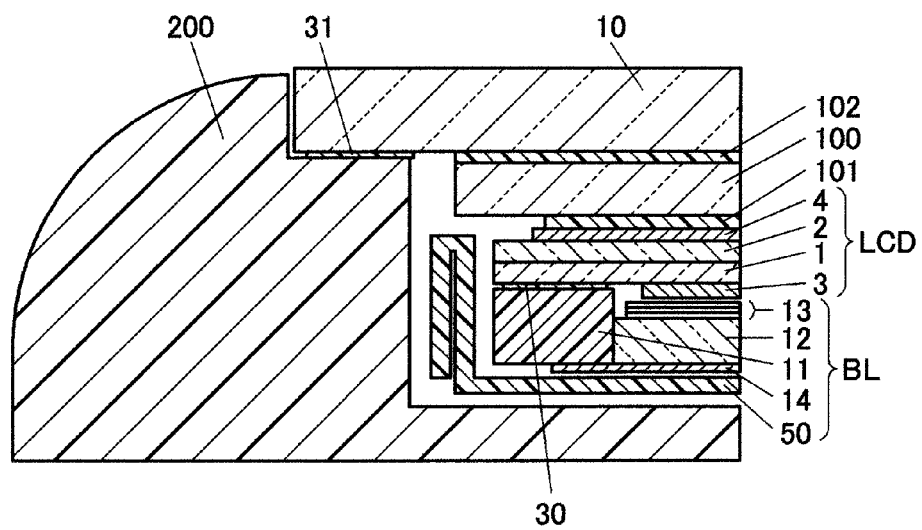
FIG. 7 is a cross-sectional view of an essential part for explaining a conventional liquid crystal display device having the hybrid panel structure with a touch panel.

The projecting portions 53 formed on the side walls 52 of the inner frame 50 may be arranged, as shown in FIG. 6A and FIG. 6B, such that the two projecting portions 53 are arranged in a spaced-apart manner from each other with a distance of L in one of the A area (A-ERA) and the B area (B-ERA). FIG. 6A and FIG. 6B are views showing a modification of the inner frame 50 of this embodiment, wherein FIG. 6A is a plan view and FIG. 6B is a side view. Further, symbol A indicated in FIG. 6A and FIG. 6B indicates engaging pawls for fixing the inner frame 50 to the mold 11.

Heretofore, the explanation has been made with respect to the case where the projecting portions 53 are formed on the side walls 52 of the inner frame 50 such that the two projecting portions 53 are formed on two side walls 52 of the inner frame 50 on a long side respectively. However, the projecting portions 53 may be formed on the side walls 52 of the inner frame 50 such that the three projecting portions 53 are formed on two side walls 52 of the inner frame 50 on a long side respectively.

Further, heretofore, the explanation has been made with respect to the embodiment where the invention is applied to the liquid crystal display device having the hybrid structure with a touch panel. However, the invention is also applicable to a so-called liquid crystal display device having the hybrid structure which is not provided with the touch panel 100 between the liquid crystal display panel LCD and the front panel 10.

Although the inventions made by inventors of the invention have been specifically explained based on the embodiment heretofore, it is needless to say that the invention is not limited to the above-mentioned embodiment, and various modifications are conceivable without departing from the gist of the invention.

What is claimed is:

1. A display device comprising:
a display panel having a first substrate and a second substrate;
a backlight including a mold which is arranged on a side of the display panel opposite to a viewer, the backlight including a light guide plate inside the mold and optical sheets on the light guide plate;
a front panel which is arranged on a viewer's side of the display panel, the front panel and the display panel being fixed to each other;
a casing to which a peripheral portion of the front panel is fixed;
an inner frame which houses the mold therein; and
a lower frame which houses the inner frame therein, wherein
the inner frame has a flat portion and side walls provided to a periphery of the flat portion,
peripheral portions on four sides of the first substrate are fixed to a first surface of the flat portion of the inner frame,
peripheral portions on four sides of the mold are fixed to a surface of the flat portion of the inner frame on a side opposite to the first surface of the flat portion of the inner frame,
the first substrate includes a non-overlapping region where the first substrate does not overlap with the second substrate,
at least one projecting portion is formed on first and second side walls of the inner frame parallel to two sides of the non-overlapping region of the first substrate which intersect with one side of the non-overlapping region of the first substrate, the at least one projecting portion of the inner frame has an opening portion, the lower frame has an opening portion through which the projecting portion of the inner frame penetrates, the at least one projecting portion of the inner frame penetrates the opening portion of the lower frame and projects to a side of the lower frame opposite to the display panel, a protruding portion is formed on the casing correspondingly to the at least one projecting portion of the inner frame, and the inner frame is fixed to the casing by making an opening portion formed in the at least one projecting portion of the inner frame engage with the protruding portion of the casing, wherein the casing includes an opening portion into which the at least one projecting portion of the inner frame is inserted, and wherein the protruding portion is arranged in the inside of the opening portion formed in the casing in the direction orthogonal to the at least one projecting portion of the inner frame.

2. The display device according to claim 1, wherein a touch panel is provided between the display panel and the front panel.

3. The display device according to claim 1, wherein two or three projecting portions is formed on the first and second side walls of the inner frame respectively.

4. The display device according to claim 3, wherein the projecting portions are formed on the first and second side walls of the inner frame in a spaced-apart manner from each other with a distance of 20 mm or more.

5. The display device according to claim 1, wherein the peripheral portions on four sides of the first substrate are fixed to the first surface of the flat portion of the inner frame by a pressure sensitive adhesive double-coated tape, and the peripheral portions on four sides of the mold are fixed to the surface of the flat portion of the inner frame on a side opposite to the first surface by a pressure sensitive adhesive double-coated tape.

6. The display device according to claim 1, wherein a semiconductor chip is mounted on the non-overlapping region of the first substrate.

* * * * *